US008113335B2

(12) United States Patent
Aronsson et al.

(10) Patent No.: US 8,113,335 B2
(45) Date of Patent: Feb. 14, 2012

(54) UNIT FOR GROUPING PACKAGES ALONG A TRANSFER PATH

(75) Inventors: Niclas Aronsson, Alingsås (SE);
Fredrik Hansson, Uddevalla (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 315 days.

(21) Appl. No.: 12/446,693

(22) PCT Filed: Dec. 13, 2007

(86) PCT No.: PCT/EP2007/063912
§ 371 (c)(1),
(2), (4) Date: Apr. 22, 2009

(87) PCT Pub. No.: WO2008/071778
PCT Pub. Date: Jun. 19, 2008

(65) Prior Publication Data
US 2010/0089721 A1    Apr. 15, 2010

(30) Foreign Application Priority Data
Dec. 14, 2006    (EP) .................................... 06126180

(51) Int. Cl.
*B65G 47/26*    (2006.01)
(52) U.S. Cl. ................... 198/419.3; 198/419.2; 198/740
(58) Field of Classification Search ............... 198/418.2, 198/418.4, 419.2, 419.3, 443, 740
See application file for complete search history.

(56) References Cited

U.S. PATENT DOCUMENTS

| 3,194,382 | A | * | 7/1965 | Nigrelli et al. ............. 198/418.1 |
| 3,872,647 | A | * | 3/1975 | Langen et al. .................. 53/157 |
| 4,627,220 | A | * | 12/1986 | Lynch ............................. 53/414 |
| 4,637,509 | A | * | 1/1987 | Raudat et al. .............. 198/419.3 |
| 5,097,939 | A | * | 3/1992 | Shanklin et al. ........... 198/419.2 |
| 5,147,027 | A | * | 9/1992 | Cruver ....................... 198/419.3 |
| 5,551,550 | A | * | 9/1996 | Marshall et al. ............. 198/432 |
| 5,667,055 | A | * | 9/1997 | Gambetti ................... 198/419.3 |

(Continued)

FOREIGN PATENT DOCUMENTS

EP    1 688 375 A1    8/2006

(Continued)

OTHER PUBLICATIONS

International Search Report (PCT/ISA/210) Feb. 18, 2008.

(Continued)

*Primary Examiner* — Douglas Hess
(74) *Attorney, Agent, or Firm* — Buchanan, Ingersoll & Rooney PC

(57) ABSTRACT

A unit for grouping packages along a transfer path includes an input station receiving the packages arranged in longitudinal lines parallel to the transfer path; an output station for groups defined by a given number of packages from respective longitudinal lines and aligned in at least one line crosswise to the transfer path. A movable conveying surface is supplied at predetermined time intervals with a number of packages equal to that in each group, and which feeds the packages along the transfer path. At least one aligning member is moved cyclically along a first path having a work portion parallel to the transfer path, and at least one push member is moved cyclically along a second path having a work portion parallel to the transfer path. The aligning member and the push member are moved respectively by independent first and second conveying mechanisms, and the work portions of the first and second paths coincide with each other.

12 Claims, 4 Drawing Sheets

U.S. PATENT DOCUMENTS

| | | | |
|---|---|---|---|
| 6,360,871 B1* | 3/2002 | Meyer et al. | 198/419.1 |
| 6,688,456 B2* | 2/2004 | Jones et al. | 198/415 |
| 6,763,929 B2* | 7/2004 | Malini | 198/419.3 |
| 6,793,064 B2* | 9/2004 | Schoeneck et al. | 198/419.3 |
| 6,843,360 B2* | 1/2005 | Peterman et al. | 198/429 |
| 7,222,716 B2* | 5/2007 | Peterman et al. | 198/419.3 |
| 7,481,309 B2* | 1/2009 | Wagner et al. | 198/419.3 |
| 7,726,463 B2* | 6/2010 | Aronsson | 198/419.3 |
| 7,752,828 B2* | 7/2010 | Gudim et al. | 53/534 |
| 7,757,462 B2* | 7/2010 | Harrison et al. | 53/447 |
| 7,815,034 B2* | 10/2010 | Fleck et al. | 198/437 |
| 7,874,417 B2* | 1/2011 | Oppici | 198/419.3 |
| 7,900,766 B2* | 3/2011 | Takayama et al. | 198/419.3 |

FOREIGN PATENT DOCUMENTS

WO    WO 2006/082230 A1    8/2006

OTHER PUBLICATIONS

Written Opinion (PCT/ISA/237) Feb. 18, 2008.

* cited by examiner

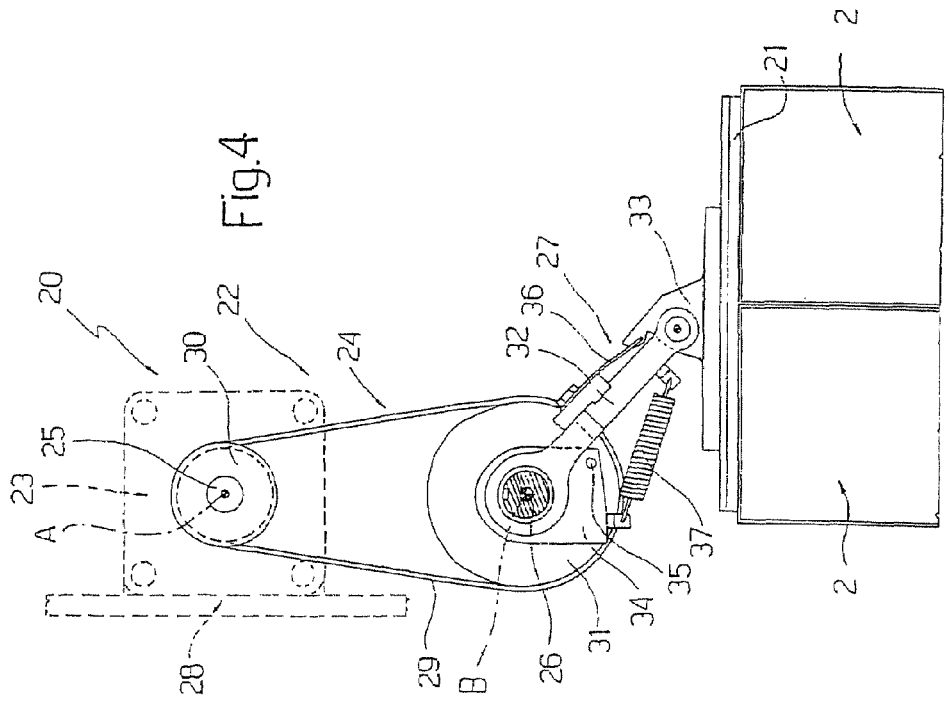
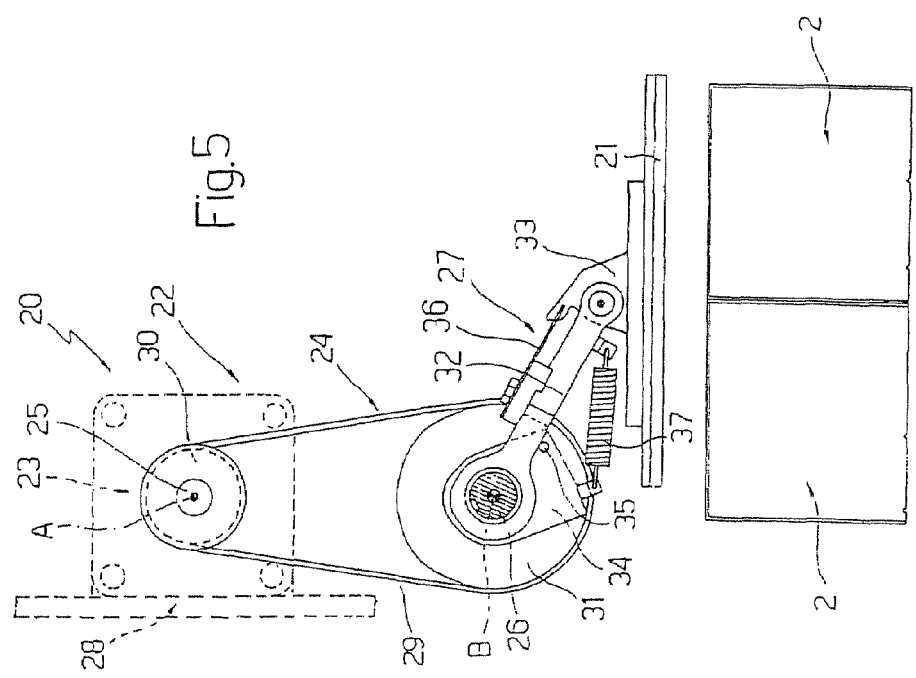

UNIT FOR GROUPING PACKAGES ALONG A TRANSFER PATH

TECHNICAL FIELD

The present invention relates to a unit for grouping packages along a transfer path.

In the following description and Claims, the term "package" is used in its widest sense to indicate any container for packaging liquid or pourable food products, and therefore includes, not only packets made of multilayer sheet material and similar, to which reference is made hereinafter purely by way of example, but also glass or plastic bottles, tins, etc.

BACKGROUND ART

As is known, many pourable food products, such as fruit juice, UHT (ultra-high-temperature treated) milk, wine, tomato sauce, etc., are sold in packages made of sterilized sheet packaging material.

A typical example of this type of package is the parallelepiped-shaped package for liquid or pourable food products known as Tetra Brik Aseptic (registered trademark), which is made by folding and sealing laminated strip packaging material. The packaging material has a multilayer structure comprising a layer of base material, e.g. paper, covered on both sides with layers of heat-seal plastic material, e.g. polyethylene. In the case of aseptic packages for long-storage products, such as UHT milk, the packaging material comprises a layer of oxygen-barrier material, e.g. aluminium foil, which is superimposed on a layer of heat-seal plastic material, and is in turn covered with another layer of heat-seal plastic material eventually forming the inner face of the package contacting the food product.

As is known, packages of this sort are produced on fully automatic packaging lines, on which a continuous tube is formed from the web-fed packaging material; the web of packaging material is sterilized, e.g. by applying a chemical sterilizing agent such as a hydrogen peroxide solution, which is subsequently removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

In both the above cases, the finished packages are fed successively to a grouping unit, where they are formed into separate groups of a given number, which are eventually packed in packing material, e.g. cardboard or plastic film, to form respective packs for transport to retailers.

More specifically, the packages are fed to the grouping unit in lines parallel to the travelling direction, and are temporarily accumulated at a receiving station; a predetermined number of packages at the receiving station are then fed onto a conveyor for transfer to an output station. Along the path defined by the conveyor, the packages in each group are aligned into one or more lines crosswise to the travelling direction, and are then pushed to the output station, where they are packed in packing material to form a relative pack.

One example of a known grouping unit, suitable for grouping plastic bottles, is illustrated in U.S. Pat. No. 6,793,064.

More specifically, the above unit substantially comprises a continuous belt conveyor having a straight flat conveying branch, onto which the bottles are fed, at predetermined time intervals and in groups of a predetermined number, for transfer to a downstream packing station, where each group of bottles so formed in packed for delivery to retailers.

As they are fed to the packing station, the bottles in each group are first aligned into a specific configuration, and are then pushed, in that configuration, to the packing station. This is done by means of two separate mechanisms—an aligning mechanism and a push mechanism—arranged in succession in the travelling direction of the bottles.

The aligning mechanism is located over the conveyor, and comprises a number of aligning bars extending crosswise to the travelling direction of the bottles, and which are fed by a chain drive device along an endless path having a portion facing and parallel to the conveying branch of the conveyor.

Each group of bottles fed onto the conveyor comes to rest against a relative downstream aligning bar travelling slower than the conveyor.

The aligning bars therefore provide for slowing the bottles down slightly with respect to the speed of the conveyor, so as to compact the bottles in the travelling direction and align them into one or more lines crosswise to the travelling direction. The aligning bars also prevent the bottles from toppling over on the conveyor.

The push mechanism is located over the conveyor and downstream from the aligning mechanism in the travelling direction of the bottles, and, like the aligning mechanism, comprises a number of push bars extending crosswise to the travelling direction of the bottles, and which are fed by a further chain drive device along an endless path having a portion facing and parallel to the conveying branch of the conveyor.

Where the aligning bars release the relative groups of bottles, each push bar interacts with the upstream side of the bottles in each group to push the group to the packing station at the same speed as the conveyor.

Known units of the type described above are extremely bulky, leave room for improvement as regards output, and are subject to relatively severe acceleration and deceleration forces resulting in possible slippage between the packages and the conveyor.

DISCLOSURE OF INVENTION

It is an object of the present invention to provide a package grouping unit designed to provide a straightforward, low-cost solution to at least one of the aforementioned drawbacks typically associated with known units.

According to the present invention, there is provided a unit for grouping packages along a transfer path, as claimed in claim 1.

BRIEF DESCRIPTION OF THE DRAWINGS

A preferred, non-limiting embodiment of the present invention will be described by way of example with reference to the accompanying drawings, in which:

FIGS. 4 and 5 show larger-scale side views of a further detail of the FIGS. 1 and 2 unit in two different operating positions.

BEST MODE FOR CARRYING OUT THE INVENTION

Figure 1:
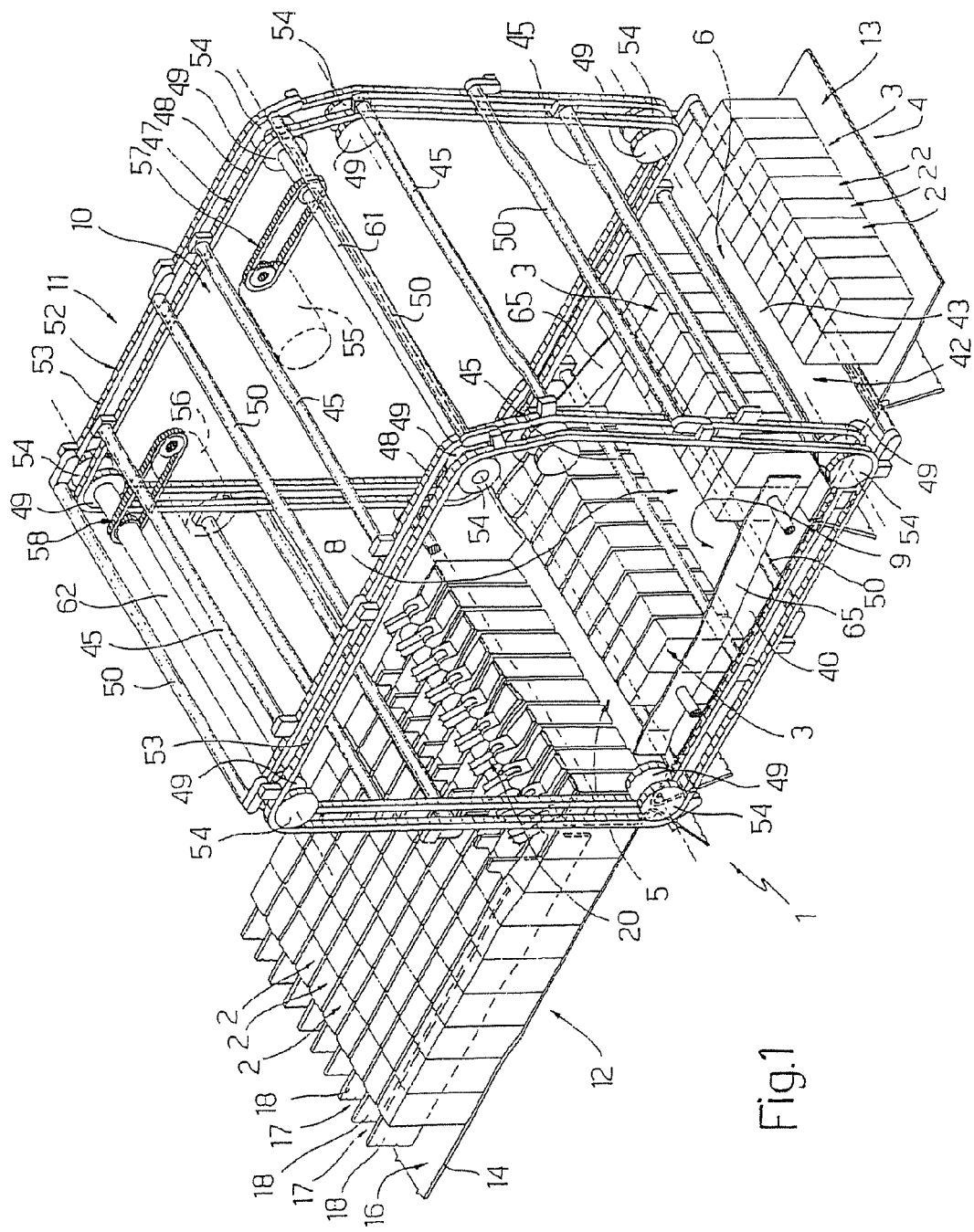
FIG. 1 shows a view in perspective, with parts removed for clarity, of a package grouping unit in accordance with the teachings of the present invention.
Figure 2:
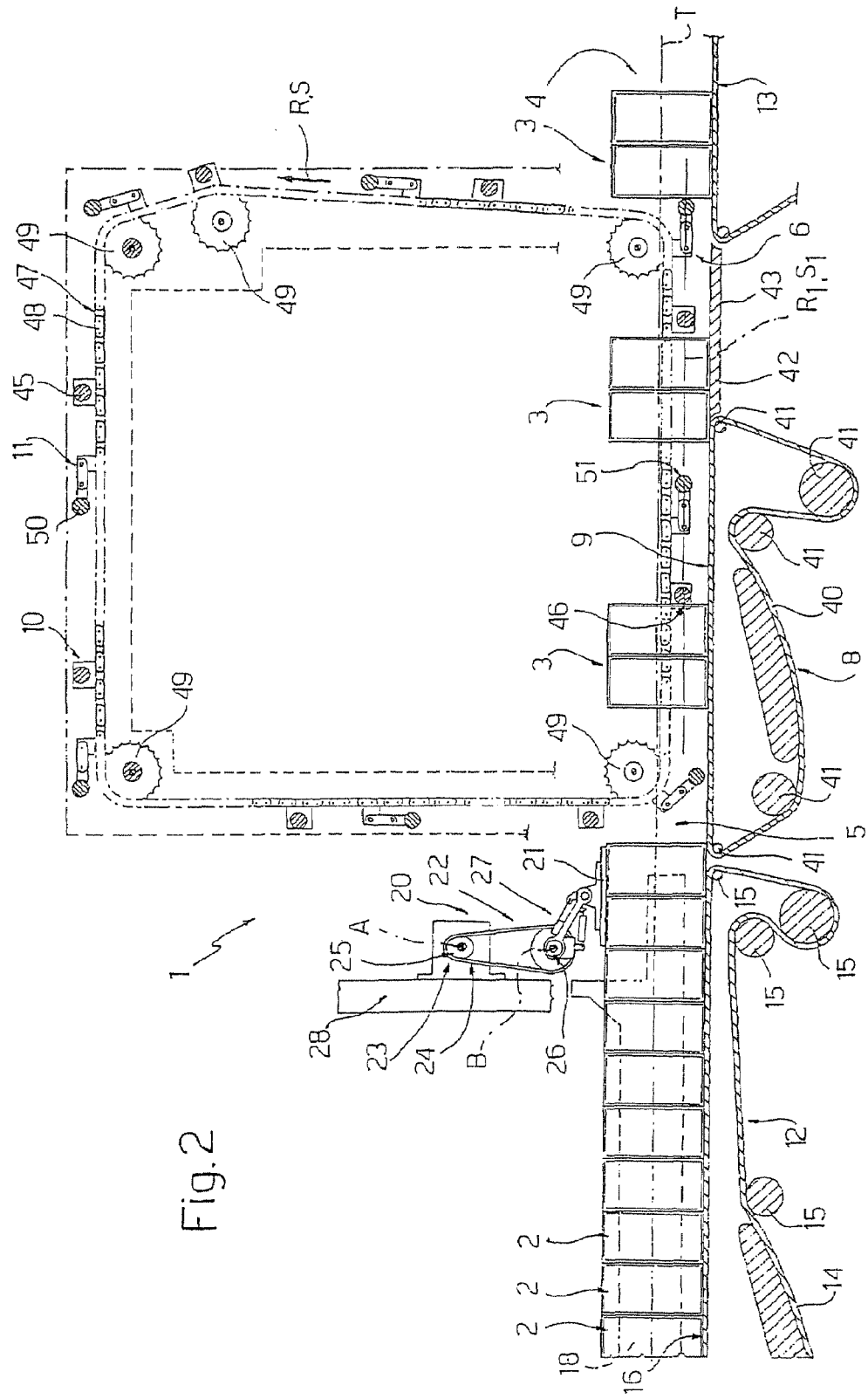
FIG. 2 shows a side view of the FIG. 1 unit.

With reference to FIGS. 1 and 2, number 1 indicates as a whole a unit in accordance with the present invention for grouping packages 2 along a transfer path T—in the example shown, a straight transfer path. More specifically, unit 1 provides for separating packages 2 into groups 3, of a predetermined number and configuration, for supply to a packing unit 4 (shown only partly in FIGS. 1 and 2) where groups 3 are packed in packing material (not shown), e.g. cardboard or plastic film, to form relative packs for transport to retailers.

In the example shown, packages 2 are defined by parallelepiped-shaped packets made, as described previously in detail, of multilayer sheet packaging material, which is filled with a pourable food product, such as pasteurized or UHT milk, fruit juice, wine, etc., and sealed.

Alternatively, packages 2 may be defined by a number of packets held together by packing material, e.g. plastic film, or may be defined by other types of packaging containers, such as bottles, tins, etc.

Unit 1 substantially comprises an input station 5 for receiving packages 2 arranged in longitudinal lines parallel to path T; an output station 6 for groups 3 comprising a given number of packages 2 from respective longitudinal lines and aligned in one or more lines crosswise to path T; a conveyor 8 defining a moving conveying surface 9 fed at predetermined intervals with a number of packages 2 equal to that of each group 3, and which feeds packages 2 from input station 5 to output station 6 along path T; an aligning device 10, which interacts with packages 2 on conveyor 8 to align them into one or more lines crosswise to path T as they travel towards output station 6; and a push device 11, which interacts with groups 3 of aligned packages 2 to push the groups out of unit 1.

More specifically, packages 2 are fed to input station 5 by a step-operated belt conveyor 12, and, once formed into separate groups 3, are fed from output station 6 to a further belt conveyor 13 forming part of packing unit 4 and shown only partly in the accompanying drawings.

More specifically, conveyor 12 comprises a belt 14 looped about a number of rollers 15—at least one of which is powered—and defining, for packages 2, a flat horizontal top conveying surface 16 coplanar with and upstream from conveying surface 9 of conveyor 8. More specifically, as they travel on conveyor 12, packages 2 are kept in longitudinal lines parallel to path T by a number of fixed channels 17 formed on top of conveying surface 16. Each channel 17 is bounded by two lateral guide walls 18, between which a relative longitudinal line of packages 2, resting upright on conveying surface 16, is fed.

In known manner, conveyor 12 is driven by a servomotor (not shown) for time intervals of a length depending on the number of packages 2 to be fed, at each drive step of conveyor 12, to input station 5 to form a relative group 3. That is, for each drive step of conveyor 12, a given number of packages 2 are transferred from a downstream portion of conveying surface 16 of conveyor 12 to input station 5 of unit 1, defined by an upstream portion of conveying surface 9 of conveyor 8. Each drive step is followed by a pause, in which packages 2 are accumulated on said downstream portion of conveying surface 16.

The number of packages 2 fed to conveyor 8 is controlled in known manner by sensors, e.g. optical sensors, not shown in the drawings, by not being essential to a clear understanding of the present invention.

A retaining device 20, activated synchronously with the pauses of conveyor 12, is preferably provided to hold back the queue of packages 2 waiting to be fed to input station 5.

More specifically, retaining device 20 (FIGS. 1, 2, 4, 5) is located over the downstream portion of conveying surface 16, and comprises a number of stop plates 21 activated selectively to cooperate with the top of the downstream packages 2 in respective longitudinal lines.

More specifically, each stop plate 21 is connected by a drive 22 to a servomotor 23, by which it is moved between a raised release position (FIG. 5), in which it is detached from packages 2 in the relative longitudinal line to allow free access to conveyor 8, and a lowered retaining position (FIGS. 1, 2, 4), in which it cooperates with the top of one or more packages 2 in the relative longitudinal line, located immediately upstream from input station 5, to prevent it/them from moving towards conveyor 8.

With particular reference to FIGS. 4 and 5, drive 22 substantially comprises a belt drive 24 for transferring motion from an output shaft 25 of servomotor 23 to a driven shaft 26; and a number of lever mechanisms 27 connecting respective stop plates 21 to shaft 26.

More specifically, shafts 25, 26 have respective axes A, B parallel to each other and perpendicular to transfer path T, and are supported, in axially fixed positions and so as to rotate about respective axes A, B, by a supporting structure 28 only shown partly; and drive 24 comprises a belt 29 looped about two pulleys 30, 31 angularly integral with respective shafts 25, 26.

Each lever mechanism 27 substantially comprises:

a first lever 32 having one end hinged to shaft 26, and an opposite end hinged to a projection 33 formed on the opposite side of relative stop plate 21 to that cooperating with packages 2; and a second lever 34 shorter than lever 32 and having one end fitted to shaft 26, and an opposite free end with opposite lateral projections 35, which cooperate with the edge of lever 32 to rotate lever 32 as shaft 26 rotates.

Each lever mechanism 27 also comprises a leaf spring extending parallel to lever 32 and having one end fixed to a projection projecting from the opposite side of lever 32 to that cooperating with lever 34, and an opposite end engaged inside a respective seat formed in projection 33 of stop plate 21 and at a distance from the hinge point of lever 32.

Each lever mechanism 27 also advantageously comprises a cylindrical coil spring 37 interposed between levers 32 and 34, and which loads relative stop plate 21 elastically into the lowered retaining position on the relative longitudinal line of packages 2. In other words, each stop plate 21 is individually loaded elastically onto relative packages 2 by a relative spring 37, so as to adapt perfectly to the shape of packages 2.

Packages 2 in each group 3 are aligned while on conveyor 8, which is preferably a belt conveyor and is driven continuously at constant or variable speed by a known servomotor (not shown).

With particular reference to FIGS. 1 and 2, conveyor 8 substantially comprises a belt 40 looped about a number of rollers 41—at least one of which is connected to said servomotor—and defining top conveying surface 9 for packages 2.

Output station 6 is advantageously defined by a decelerating surface 42 coplanar with and downstream from conveying surface 9, and which slows down groups 3 of packages 2 prior to transfer to packing unit 4.

Decelerating surface 42 is preferably defined by a fixed horizontal surface 43 interposed between conveyors 8 and 13.

Alternatively, decelerating surface 42 may be defined by a movable surface moving slower than conveying surface 9, or solely by surface 9.

Aligning device 10 comprises one or more bar-type aligning members 45, which extend perpendicularly to the travelling direction of packages 2, move cyclically along a path R having a work portion $R_1$ parallel to path T from input station 5 to output station 6, and each define an aligning surface 46 against which, at each cycle, the packages 2 of a relative upstream group 3 come to rest and are aligned in one or more lines crosswise to path T.

In the example shown, aligning members 45 are eight in number and are fitted, equally spaced, to a chain conveyor 47 located over conveying surface 9 of conveyor 8 and over decelerating surface 42.

More specifically, conveyor 47 comprises two identical endless chains 48, which extend on opposite sides of conveying surface 9 of conveyor 8 and decelerating surface 42, support aligning members 45 in between, and define path R of aligning members 45.

Each chain 48 is looped about a relative number of rollers 49 to assume a roughly rectangular configuration, with two sides parallel to conveying surface 9 of conveyor 8 and to decelerating surface 42, and two sides perpendicular to surfaces 9, 42.

In exactly the same way as aligning device 10, push device 11 comprises one or more bar-type push members 50, which extend perpendicularly to the travelling direction of packages 2, move cyclically along a path S having a work portion $S_1$ parallel to path T from input station 5 to output station 6, and each define a push surface 51 which, at each cycle, acts on each group 3 of packages 2 downstream from push member 50 to push group 3 out of unit 1.

In the example shown, push members 50 are eight in number and are fitted, equally spaced, to a chain conveyor 52 identical to conveyor 47 and located over conveying surface 9 of conveyor 8 and over decelerating surface 42.

More specifically, conveyor 52 comprises two identical endless chains 53, which extend on opposite sides of conveying surface 9 of conveyor 8 and decelerating surface 42, support push members 50 in between, and define path S of push members 50.

Chains 48 of conveyor 47 and chains 53 of conveyor 52 are advantageously positioned parallel and facing each other, so that paths R and S defined by them coincide.

As shown in FIGS. 1 and 2, each chain 53 is looped about a relative number of rollers 54, coaxial with respective rollers 49, to assume the same roughly rectangular configuration as chains 48, with two sides parallel to conveying surface 9 of conveyor 8 and to decelerating surface 42, and two sides perpendicular to surfaces 9, 42.

In other words, chains 48 and 53 are coplanar along each of the four sides along which they extend.

In the example shown, chains 48 are located between the more outer chains 53.

Conveyors 47 and 52 are advantageously driven by respective independent servomotors 55, 56.

As shown in FIG. 1, each servomotor 55, 56 controls the relative pair of chains 48, 53 by means of a respective belt drive 57, 58 connecting an output shaft of servomotor 55, 56 to a shaft 61, 62 supporting a relative pair of rollers 49, 54; the other rollers 54, 49, coaxial with those (49, 54) powered by servomotor 55, 56, and supporting the other two chains 53, 48, are fitted idly to the relative shaft 61, 62 driven by servomotor 55, 56.

In a preferred embodiment of the present invention, chains 48, and therefore aligning members 45, are driven intermittently by relative servomotor 55, whereas chains 53, and therefore push members 50, are driven continuously by relative servomotor 56.

In the example shown, chains 48 and aligning members 45 are synchronized with conveyor 12 supplying packages 2 to conveyor 8.

Figure 3:
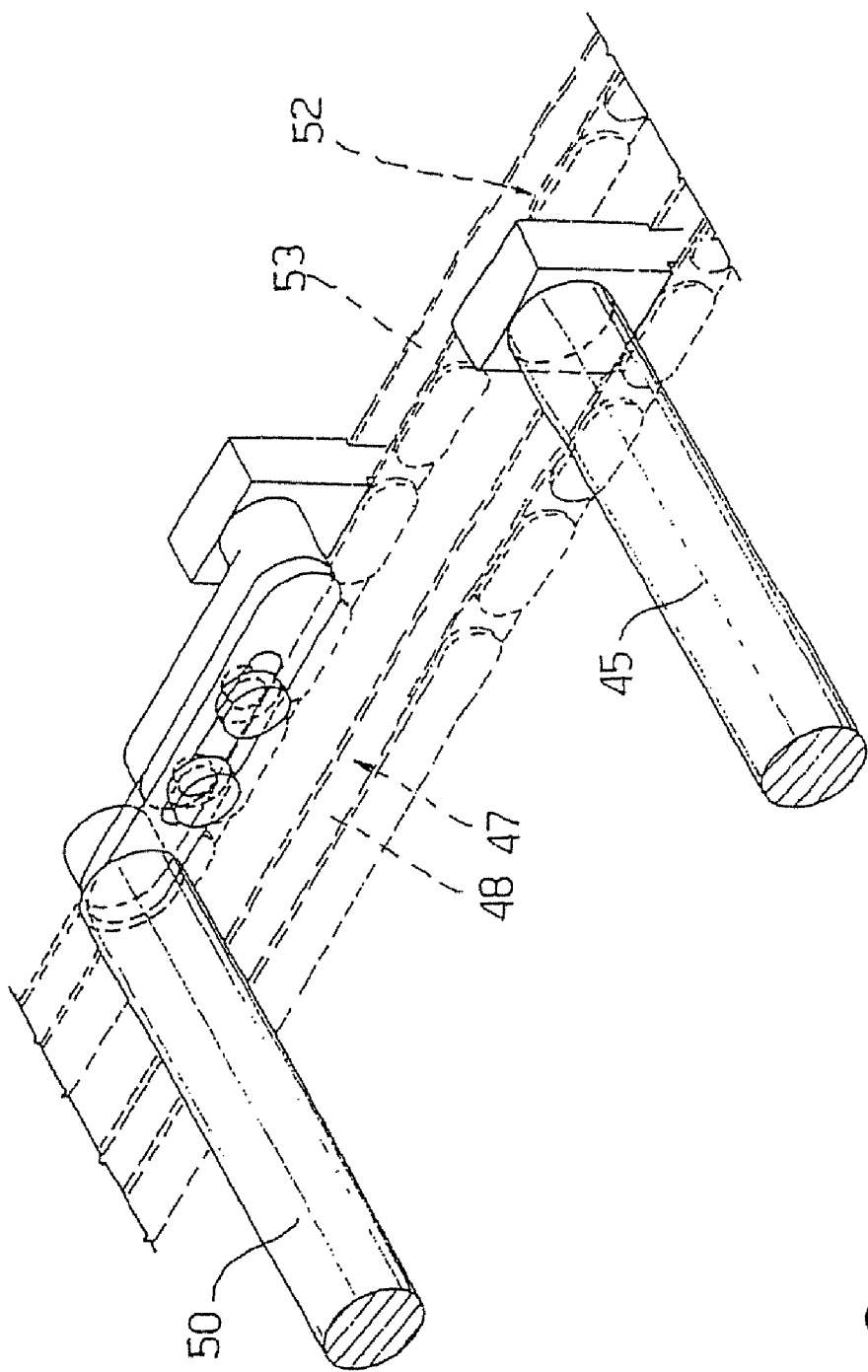
FIG. 3 shows a larger-scale view in perspective of a detail of the FIGS. 1 and 2 unit.

As shown particularly in FIG. 3, each aligning member 45 extends between the links of chains 48 to which it is fixed; whereas each push member 50 extends between corresponding links of chains 53 located downstream, in the travelling direction of chains 53, from the links to which it is fixed, so that, at output station 6 (FIG. 2), push members 50 project with respect to relative chains 53 in the direction of transfer path T to accompany groups 3 of packages 2 onto an upstream portion of conveyor 13 of packing unit 4.

As shown in FIG. 1, packages 2 travelling along conveying surface 9 of conveyor 8 are retained laterally by two fixed side members 65, which converge towards output station 6 to compact packages 2 perpendicularly to path T.

The position of side members 65 crosswise to the travelling direction of packages 2 may preferably be adjusted using known systems not shown.

Operation of unit 1 will be described with reference to the formation of one group 3 of packages 2, and as of an initial condition (FIG. 2), in which conveyor 12 is stationary, the packages 2 eventually forming said group are accumulated on the downstream portion of conveying surface 16 of conveyor 12, and stop plates 21 of retaining device 20 are in the lowered retaining position, cooperating with the packages 2 adjacent to input station 5. When conveyor 12 is activated, stop plates 21 of retaining device 20 are rotated into the raised release position (FIG. 5) to allow a given number of packages 2 to be fed onto conveyor 8.

That is, servomotor 23 is activated simultaneously with conveyor 12, and, by means of drive 24, rotates shaft 26 about axis B to raise stop plates 21 by means of lever mechanisms 27.

The packages 2 transferred from conveyor 12 to conveyor 8 come to rest against aligning surface 46 of an aligning member 45 travelling through input station 5.

Once the predetermined number of packages 2 is fed off conveyor 12, this is arrested, and stop plates 21 of retaining device 20 are rotated back into the lowered retaining position (FIGS. 2, 4) holding back the queue of packages 2 accumulated on conveying surface 16.

The group 3 of packages 2 fed onto conveyor 8, on the other hand, is fed by conveyor 8 along path T to output station 6.

In the course of which, conveyor 47, supporting aligning members 45, is stopped and then started again at a faster speed than conveyor 8; packages 2 are therefore first grouped together against the relative stationary aligning member 45, and are aligned in lines—in this case, two lines—crosswise to path T; and, when the aligning member 45 is detached from packages 2 and started moving again along path R, packages 2 are fed by conveyor 8 to fixed surface 43.

On reaching fixed surface 43, packages 2 are first slowed down and eventually stopped by fixed surface 43. That is, at the output of conveyor 8, packages 2 slide to a halt on fixed surface 43.

As group 3 travels along path T, the component packages 2 are compacted perpendicularly to path T by the guide action of side members 65.

Next, the adjacent push member 50, upstream from the group 3 of packages 2 arrested on fixed surface 43, catches up with and pushes the downstream packages 2 out of unit 1 onto conveyor 13 of packing unit 4.

The advantages of unit 1 according to the present invention will be clear from the foregoing description.

In particular, aligning and push members 45, 50 being driven by independent servomotors 55, 56 and moving along coincident paths R, S, maximum output of unit 1 can be achieved while minimizing the overall size of unit 1.

In fact, the speed of push members 50 is no longer necessarily determined by that of aligning members 45, which are necessarily "slower" than conveyor 8 transporting packages 2.

More specifically, by operating push members 50 continuously, and aligning members 45 intermittently, with stop times for effective alignment in very little space, and extremely fast running times to make up for the stop times, the output rate is determined directly by the operating rate of push members 50.

Moreover, by locating chains 48, 53 of aligning and push members 45, 50 on opposite sides of conveyor 8 transporting packages 2, so that aligning and push members 45, 50 travel along the same path, the overall size of unit 1 is minimized both in and crosswise to the travelling direction of packages 2.

Finally, the combination of movements and deceleration to which packages 2 are subjected as they travel along transfer path T minimizes the acceleration and deceleration forces on packages 2, and potential slippage of packages 2 on conveying surface 9 and decelerating surface 42.

Clearly, changes may be made to unit 1 as described and illustrated herein without, however, departing from the scope defined in the accompanying Claims.

In particular, conveyors 47 and 52 may be so arranged that only all or part of work portions $R_1$, $S_1$ of paths R, S coincide.

Moreover, retaining device 20 may be used on different types of grouping units, such as the one described in the Applicant's International Patent PCT/EP2006/050644 or in U.S. Pat. No. 6,793,064.

The invention claimed is:

1. A unit for grouping packages along a transfer path, said unit comprising:
    an input station receiving said packages arranged in longitudinal lines parallel to said transfer path;
    an output station for groups defined by a given number of packages from respective said longitudinal lines and aligned in at least one line crosswise to said transfer path;
    a movable conveying surface supplied at predetermined time intervals with a number of packages equal to that in each group, and which feeds said packages from said input station to said output station along said transfer path;
    at least one aligning member, which is moved cyclically along a first path having at least one work portion parallel to said transfer path from said input station to said output station, and comprises an aligning surface against which, at each cycle, the packages in each group upstream from the aligning member come to rest and are aligned in at least one line crosswise to the transfer path;
    at least one push member, which is moved cyclically along a second path having at least one work portion parallel to said transfer path from said input station to said output station, and comprises a push surface which, at each cycle, acts on each group of packages downstream from the push member to push said group out of said unit; and
    wherein said aligning member and said push member are moved along said first and said second path respectively by independent first and second conveying means; and in that said work portions of said first and second path coincide at least partly.

2. A unit as claimed in claim 1, wherein said work portions of said first and second path are wholly coincident with each other.

3. A unit as claimed in claim 1 wherein said first and second paths are wholly coincident with each other.

4. A unit as claimed in claim 1, wherein said aligning member is moved intermittently along said first path.

5. A unit as claimed in claim 1, wherein said aligning member and said push member comprise respective bars parallel to each other and crosswise to said transfer path.

6. A unit as claimed in claim 5, wherein said first conveying means comprise a pair of first endless conveying members located on opposite sides of said conveying surface and supporting said aligning member between them; wherein said second conveying means comprise a pair of second endless conveying members located on opposite sides of said conveying surface and supporting said push member between them; and wherein said first and second conveying members are positioned parallel to and facing each other.

7. A unit as claimed in claim 6, comprising a number of said aligning and push members supported, equally spaced, by the respective said first and second conveying members.

8. A unit as claimed in claim 1, comprising a pair of lateral guide members located on opposite sides of said transfer path and converging with each other towards said output station to compact said packages in each group crosswise to the transfer path.

9. A unit as claimed in claim 1, comprising decelerating means, which act on said packages in each group along an end portion of said transfer path to slow down the packages prior to the action of said push member.

10. A unit as claimed in claim 9, wherein said decelerating means comprise a fixed surface extending along said transfer path, downstream from said conveying surface.

11. A unit as claimed in claim 1, wherein said conveying surface is operated continuously.

12. A unit as claimed in claim 1, comprising, close to said input station, a number of stop members, which are located at respective longitudinal lines of packages, are selectively activated to prevent access of said packages to said conveying surface, and are loaded individually towards the packages by respective elastic means.

* * * * *